(No Model.)
A. ZINTGRAFF.
BICYCLE ATTACHMENT.
No. 582,334. Patented May 11, 1897.
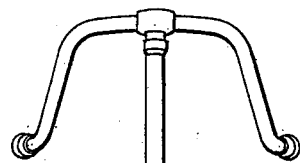
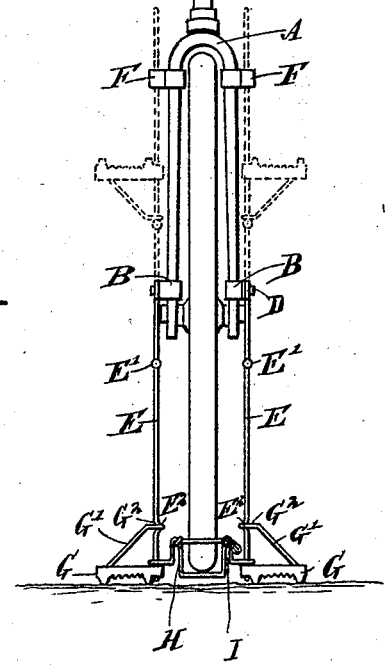
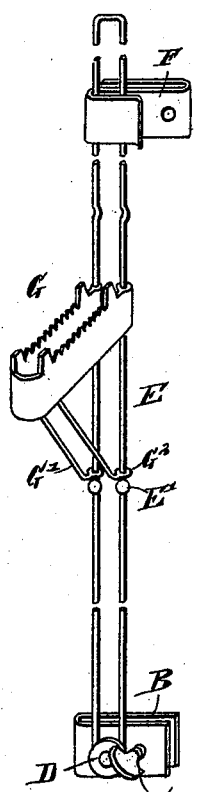
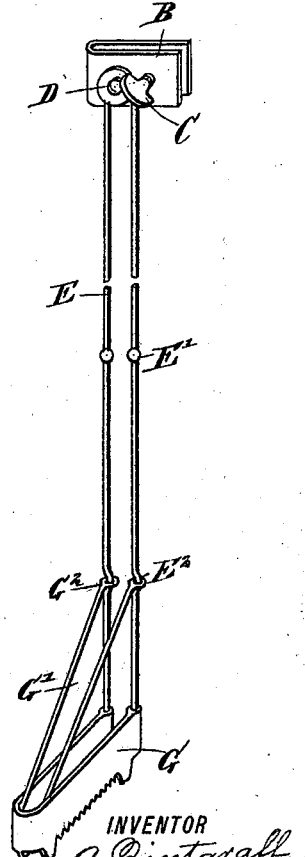
WITNESSES:
H. Walker
Rev. G. Hoster
INVENTOR
A. Zintgraff
BY
[signature]
ATTORNEYS.
THE NORRIS PETERS CO., PHOTO-LITHO., WASHINGTON, D. C.

UNITED STATES PATENT OFFICE.

AUGUST ZINTGRAFF, OF DENISON, TEXAS, ASSIGNOR TO THE TEXAS BICYCLE COMPANY, OF SAME PLACE.

BICYCLE ATTACHMENT.

SPECIFICATION forming part of Letters Patent No. 582,334, dated May 11, 1897.

Application filed June 9, 1896. Serial No. 594,826. (No model.)

*To all whom it may concern:*

Be it known that I, AUGUST ZINTGRAFF, of Denison, in the county of Grayson and State of Texas, have invented a new and Improved Bicycle Attachment, of which the following is a full, clear, and exact description.

The object of the invention is to provide a new and improved bicycle attachment arranged to serve as a foot-rest for the feet of the rider while coasting and adapted to be lowered to support the bicycle in a vertical position when not in use and to securely lock the wheel and support together to prevent the machine from being stolen.

The invention consists principally of brackets, each held on a rod movable on the fork of the steering-wheel.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a front elevation of the improvement as applied and in the position for supporting the bicycle. Fig. 2 is an enlarged perspective view of the improvement in position as a foot-rest, and Fig. 3 is a like view of the same in position as a support.

On each of the members of the front fork A is secured a clip B by means of a suitable set-screw C, and on the said clip is held a transversely-extending pivot D, on which is fulcrumed a frame E, adapted to be locked in a vertical position alongside the fork by a suitable clamping device F, attached to the upper part of a corresponding member of the fork.

The frame E is preferably made of two rods arranged parallel with each other, and on the said rods is fitted to slide a bracket G, formed with teeth on its upper edge similar to the teeth on foot-rests as now used. The bracket G is provided on its outer end with braces G', formed with eyes G², loosely engaging the said rods forming the frame E, so that the bracket, with its braces, can slide up or down on the rods forming the frame E.

The eyes G² are adapted to rest on lugs or projections E', formed on the frame-rods, so as to support the brackets G in position when the device is used as a foot-rest—that is, at the time the frame E is locked in place in an uppermost position by the clamping device F. Now when the frame E is disengaged from the clamping device F it can swing forward and downward into the position shown in Figs. 1 and 3, and as soon as the said frame has assumed a vertical position then the brackets G slide to the lower ends of the frames, with the eyes G² fastened into bends or notches E², formed in the frame-rods. The brackets G now form supports for holding the machine in a vertical position when not in use. Thus the bracket G serves a twofold purpose—that is, as a rest for the rider's feet when coasting and as bases of a support to hold the machine in a vertical position when not in use.

The two lower ends of the frames E can be connected with each other by a bar H, adapted to be passed between adjacent spokes of the wheel, the said bar being connected at its free end by a padlock I to the other frame to fasten the two frames, as well as the wheel, together to prevent unauthorized persons from riding off with the wheel.

It will be seen that the device is very simple and durable in construction, can be readily applied on any of the well-known forms of bicycles, and can be conveniently changed from one position to the other and for the purposes above mentioned.

Having thus described my invention, I claim as new and desire to secure by Letters Patent—

1. A bicycle attachment composed of frames and brackets adapted to slide thereon, means for pivoting said frames to the front fork of the machine, and means for holding them inverted in vertical position alongside said fork, as shown and described.

2. A bicycle attachment, comprising a clip secured on each member of the steering-fork, a frame fulcrumed on the said clip, and a bracket held to slide on the said frame, substantially as shown and described.

3. A bicycle attachment, comprising a clip secured on each member of the steering-fork, a frame fulcrumed on the said clip, a bracket held to slide on the said frame, and a clamping device for holding the said frame in an uppermost position, as set forth.

4. A bicycle attachment, comprising frames fulcrumed on the members of the steering-fork, brackets held on the said frames, and a locking device for connecting the frames with each other across and through the wheel, substantially as shown and described.

5. A bicycle attachment, comprising clips held on the members of the steering-fork, a frame fulcrumed on the clip, a bracket fitted to slide on the said frame, braces extending from the said bracket and engaging the said frame, and means for supporting the said braces on the said frame, substantially as shown and described.

AUGUST ZINTGRAFF.

Witnesses:
FRANZ KOHFELDS,
M. L. WOODLIEF.